United States Patent
Aoki et al.

(10) Patent No.: US 6,425,934 B1
(45) Date of Patent: Jul. 30, 2002

(54) GAS GENERATOR DISPOSAL METHOD AND SYSTEM THEREFOR

(75) Inventors: Yasuhiro Aoki; Tetuo Saitou; Kenjiro Ikeda, all of Himeji (JP)

(73) Assignee: Nippon Kayaku Kabushiki Kaisha, Tokyo (JP)

(*) Notice: Subject to any disclaimer, the term of this patent is extended or adjusted under 35 U.S.C. 154(b) by 0 days.

(21) Appl. No.: 09/850,730

(22) PCT Filed: Nov. 8, 1999

(86) PCT No.: PCT/JP99/06220

§ 371 (c)(1),
(2), (4) Date: May 9, 2001

(87) PCT Pub. No.: WO00/27674

PCT Pub. Date: May 18, 2000

(30) Foreign Application Priority Data

Nov. 9, 1998 (JP) .......................................... 10-317206

(51) Int. Cl.[7] .............................................. C21B 13/14
(52) U.S. Cl. ..................... 75/10.1; 75/10.13; 75/10.19; 75/403; 86/50; 266/144; 588/202
(58) Field of Search ...................... 75/403, 10.1, 10.13, 75/10.19; 266/144; 86/50; 588/202

(56) References Cited

U.S. PATENT DOCUMENTS

| | | | |
|---|---|---|---|
| 5,294,244 A | * | 3/1994 | Allerton, III et al. .......... 75/403 |
| 5,668,342 A | * | 9/1997 | Discher ........................ 86/50 |
| 5,741,465 A | * | 4/1998 | Gregg ........................ 588/202 |

FOREIGN PATENT DOCUMENTS

| | | |
|---|---|---|
| JP | 64-6611 | 1/1989 |
| JP | 7-277131 | 10/1995 |
| JP | 7-328586 | 12/1995 |
| JP | 9-11844 | 1/1997 |
| JP | 9-76855 | 3/1997 |
| JP | 9-253619 | 9/1997 |

* cited by examiner

Primary Examiner—Melvyn Andrews
(74) Attorney, Agent, or Firm—Oblon, Spivak, McClelland, Maier & Neustadt, P.C.

(57) ABSTRACT

A gas generator disposal method capable of disposing of large quantities of gas generators safely, efficiently and without contamination of environments, and a system therefor, the method comprising releasing an air bag deploying gas from an unused gas generator (X) by applying a YAG laser beam (R) to an igniter (P) of the gas generator (X).

13 Claims, 5 Drawing Sheets

GAS GENERATOR DISPOSAL METHOD AND SYSTEM THEREFOR

BACKGROUND TECHNIQUE

A gas generator for expanding and deploying an air bag instantaneously to protect a passenger in an automobile from an impact generated at the time of collision of the automobile is incorporated in an air bag module mounted in a steering wheel or an instrument panel. The gas generator instantaneously generates large quantities of high-temperature gas by an impact detection signal sent from an impact sensor at the time of collision.

The gas generator for emitting air bag deploying gas includes gas generating agent for generating high-temperature gas by combustion, an ignition tool for igniting and burning the gas generating agent, and an inflammation agent. Therefore, when an unused gas generator is disposed of, it is necessary to dispose of the gas generator after the ignition tool is ignited and the inflammation agent and the gas generating agent are burned.

This is because that when an automobile is disposed of, the automobile is pressed, but if the automobile having the unused gas generator is presses as it is, there is a danger that the gas generating agent, the ignition tool and the inflammation agent are ignited and an explosion is caused by mechanical energy. The gas generator is destroyed by the mechanical energy, chemical, such as sodium azide and the like, held therein flows out to contaminate environments.

As a method for disposing of an unused gas generator, there are proposed a method in which an automobile is covered with a covering member in a state in which the gas generator is assembled into the automobile and then, the gas generator is actuated (Japanese Unexamined Patent Publication No. Hei 10-152077), and a method in which an unused gas generator is actuated by heating the gas generator using an electric furnace (Japanese Unexamined Patent Publication No. Hei 7-277131).

However, according to the method for covering the automobile with the covering member, it is necessary to mount the covering members to the automobiles one by one, and this is not suitable as a method for disposing of the gas generators of mass-manufactured automobiles.

Further, according to the method for heating the gas generator, it is necessary to heat the gas generator to a burning temperature of the gas generating agent and the like, this requires large quantities of energy and thus, a large quantities of gas generators can not be disposed of due to economical reason. Further, vinyl-covered conductors, plastic connectors and the like for connecting the igniter of the gas generator and the impact sensor side are used in the gas generator. Therefore, if the gas generator is burned, plastic and vinyl are also burned, it is necessary to provide a system for preventing injurant (such as dioxin) which is becoming significant in recent years and thus, this method increases costs of the gas generator disposal method.

Thereupon, in a disposal processing of a gas generator which is forecast to be increased, it is an object of the present invention to provide a disposal method and system for disposal capable of disposing of large quantities of gas generators safely, efficiently and without contamination of environments.

DISCLOSURE OF THE INVENTION

According to a first invention, there is provided a gas generator disposal method of an unused gas generator for discharging air bag deploying gas by ignition of an igniter, comprising a processing step for irradiating the igniter with ignition energy light to ignite the igniter, thereby discharging gas from the gas generator.

With this structure, the unused gas generator alone can be processed without covering with a cover member and thus, large quantities of gas generators can be processed efficiently. Further, since the igniter is ignited by irradiation of the ignition energy light, the gas can be discharged instantaneously with a small amount of energy, and the processing time can be shortened. Since the igniter is irradiated with the ignition energy light, plastic or vinyl used in the gas generator is not burned and thus, injurant which contaminates environments is prevented from discharged out.

According to a second invention, here is provided a gas generator disposal method of an unused gas generator assembled into an air bag module for discharging air bag deploying gas by ignition of an igniter, comprising a processing step for irradiating the igniter with ignition energy light to ignite the igniter in a state in which the gas generator is assembled into the air bag module, thereby discharging gas from the gas generator.

With this structure, the gas generator can be processed in the state in which the gas generator is assembled into the air bag module, large quantities of gas generators can be processed efficiently. Further, since the igniter is ignited by irradiation of the ignition energy light, the gas can be discharged instantaneously with a small amount of energy. Since it is unnecessary to remove the gas generator from the air bag module, the processing time can be shortened further. Since the igniter is irradiated with the ignition energy light, plastic or vinyl used in the gas generator is not burned and thus, injurant which contaminates environments is prevented from discharged out.

In the first and second inventions, the igniter comprises an ignition tool only, or an ignition tool and an inflammation agent. In the processing step, only the ignition tool is irradiated with the ignition energy light to ignite the same, or at least one of the ignition tool and the inflammation agent is irradiated with the ignition energy light to ignite the same, thereby igniting the ignition tool and the inflammation agent. With this structure, it is possible to burn all of flammable gunpowder, and danger such as explosion in the subsequent step can be eliminated.

In the first and second inventions, the ignition energy light for irradiating the igniter is any one of laser, plasma, electron beam and arc discharge. Therefore, the gas generator can be disposed of efficiently.

According to a third invention, there is provided a disposal method of a gas generator generating air bag deploying gas by burning a gas generating agent by an igniter. This disposal method employs one of two processing steps to dispose of the gas generator. That is, one of the steps is for irradiating the igniter with ignition energy light to ignite the igniter to burn the gas generating agent, thereby discharging the gas, and the other step is for irradiating the gas generating agent to burn the same, thereby discharging the gas.

With this feature, the unused gas generator alone can be processed and thus, large quantities of gas generators can be processed efficiently. Further, since the igniter is ignited or the gas generating agent is burned by irradiation of the ignition energy light to burn the gas generating agent, the gas can be discharged instantaneously with a small amount of energy, and the processing time can be shortened. Since the igniter or the gas generating agent is irradiated with the ignition energy light, plastic or vinyl used in the gas generator is not burned and thus, injurant which contaminates environments is prevented from discharged out. Further, since the igniter or the gas generating agent is irradiated with the ignition energy light, it is possible to burn all of flammable gunpowder, and danger such as explosion in the subsequent step can be eliminated.

According to a fourth invention, there is provided a gas generator disposal system of an unused gas generator for discharging air bag deploying gas by ignition of an igniter. This disposal system comprises energy irradiating means for irradiating the igniter with ignition energy light to ignite the igniter.

With this structure, the unused gas generator alone can be processed and thus, large quantities of gas generators can be processed efficiently. Further, since the igniter is ignited by irradiation of the ignition energy light, the gas can be discharged instantaneously with a small amount of energy, and the processing time can be shortened. Since the igniter is irradiated with the ignition energy light, plastic or vinyl used in the gas generator is not burned and thus, injurant which contaminates environments is prevented from discharged out.

The fourth invention comprises transfer means for sequentially transferring large quantities of unused gas generators, and positioning means for fixing and positioning the unused gas generators transferred by the transfer means such that the igniter is opposed to the energy irradiating means. With this structure, it is possible to transfer the unused gas generators by the transfer means, and to fix and position the gas generating agent such that the igniter is opposed to the energy irradiating means. Large quantities of gas generators can efficiently be processed automatically.

The fourth invention comprises a gas shield which shields air emitted from the gas generator to the energy irradiating means. With this feature, the gas emitted from the gas generator to the energy irradiating means is shielded by the gas shield, it is possible to prevent the energy irradiating means from being damaged by the gas emitted from the gas generator.

The fourth invention further comprises an air protector for blowing out the gas emitted from the gas generator by air spray. With this feature, the air protector blows away the gas emitted from the gas generator to the energy irradiating means by air spray and thus, it is possible to prevent the energy irradiating means from being damaged by the gas emitted from the gas generator.

According to a fifth invention, there is provided a gas generator disposal system of an unused gas generator for discharging air bag deploying gas by ignition of an igniter. This disposal system comprises energy irradiating means for irradiating the igniter with ignition energy light to ignite the igniter, gas shielding means for shielding gas emitted from the gas generator to the energy irradiating means, and an air protector for blowing out the gas emitted from the gas generator to the energy irradiating means by air spray.

With this feature, the unused gas generator alone can be processed and thus, large quantities of gas generators can be processed efficiently. Further, since the igniter is ignited by irradiation of the ignition energy light to burn the gas generating agent, the gas can be discharged instantaneously with a small amount of energy, and the processing time can be shortened. Since the igniter or the gas generating agent is irradiated with the ignition energy light, plastic or vinyl used in the gas generator is not burned and thus, injurant which contaminates environments is prevented from discharged out. Further, since the gas emitted from the gas generator to the energy irradiating means is shielded and blown away by the gas shield and the air protector, it is possible to prevent the energy irradiating means from being damaged by the gas from the gas generator.

According to a sixth invention, there is provided a gas generator disposal system of an unused gas generator for discharging air bag deploying gas by ignition of an igniter. This disposal system comprises energy irradiating means for irradiating the igniter with ignition energy light to ignite the igniter, transfer means for sequentially transferring large quantities of unused gas generators, and positioning means for fixing and positioning the unused gas generators transferred by the transfer means such that the igniter is opposed to the energy irradiating means, gas shielding body for shielding gas emitted from the gas generator to the energy irradiating means, and an air protector for blowing out the gas emitted from the gas generator to the energy irradiating means by air spray.

With this feature, the unused gas generator alone can be processed and thus, large quantities of gas generators can be processed efficiently. Further, since the igniter is ignited by irradiation of the ignition energy light to burn the gas generating agent, the gas can be discharged instantaneously with a small amount of energy, and the processing time can be shortened. Since the igniter or the gas generating agent is irradiated with the ignition energy light, plastic or vinyl used in the gas generator is not burned and thus, injurant which contaminates environments is prevented from discharged out. Further, large quantities of gas generators can efficiently be processed automatically by the transfer means and the positioning means. Further, because of the gas shield and the air protector, it is possible to prevent the energy irradiating means from being damaged by the gas from the gas generator, and the reliability of automatic processing can be enhanced.

BEST MODE FOR CARRYING OUT THE INVENTION

A gas generator disposal method and a system therefor of the present invention irradiates an igniter of an unused gas generator including a gas generator detached from an automobile with ignition energy light, thereby allowing air bag deploying gas to emit from the gas generator.

To describe the present invention in more detail, the invention will be explained with reference to the accompanying drawings. The gas generator disposal system will be explained first and then, the disposal method will be explained.

Figure 1:
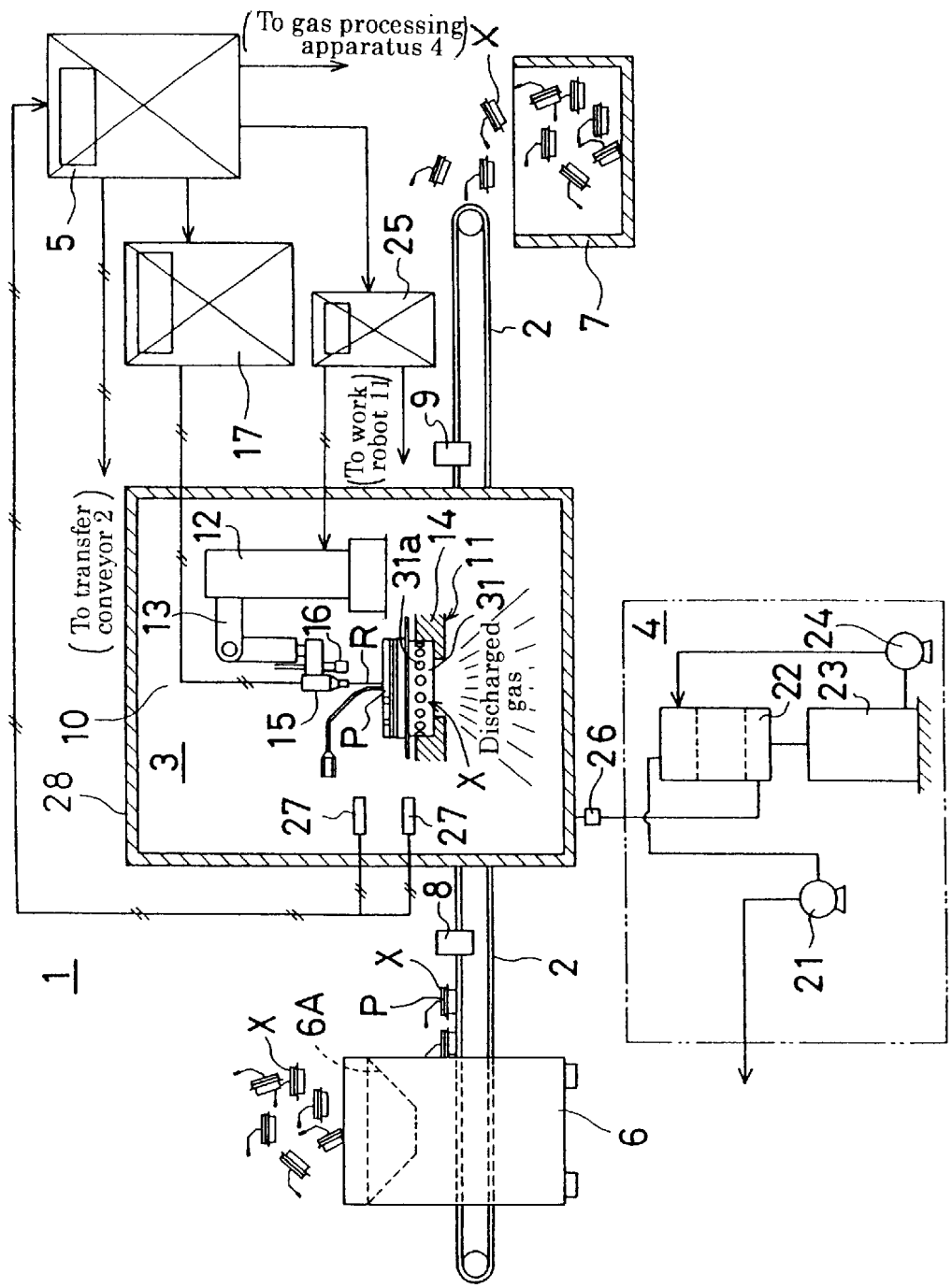
FIG. 1 is a diagram showing a structure of a disposal system for a gas generator of the present invention.

In FIG. 1, a gas generator disposal system 1 mainly comprises a transfer convey or 2 (transfer means) for transferring a gas generator X, a work processing apparatus 3 for allowing an unused gas generator X transferred by the transfer conveyor 2 to emit gas, a gas processing apparatus 4 for processing gas emitted from the gas generator X, and a centralized control apparatus 5 for controlling the entire system.

The transfer conveyor 2 is mounted between a work supply container 6 at a work-coming side and a work accommodating container 7 at a work-going side. The transfer conveyor 2 is operated and controlled based on a command from the centralized control apparatus 5. The work supply container 6 includes a work hopper 6A. The work supply container 6 supplies the gas generators X dropped from the work hopper 6A to the transfer conveyor 2 in such a manner that the gas generators X are arranged at predetermined distances from one another. A coming counter 8 for counting the number of coming unused gas generators X and a going counter 9 for counting the number of going processed gas generators X are arranged side-by-side on the transfer conveyor 2.

The work processing apparatus 3 includes a processing chamber 10 arranged on a halfway portion of the transfer conveyor 2. The work processing apparatus 3 includes a work robot 11 (positioning means) and an irradiation robot 12 (energy irradiation means) both arranged in the processing chamber 10. The processing chamber 10 is defined by a soundproofing/explosionproof wall 28. The sound proofing/explosionproof wall 28 is provided with an operation detection sensor 27 for detecting any of explosion, light emission, smoke, pressure, temperature, vibration and the like in the process in chamber 10. The operation detection sensor 27 is connected to the centralized control apparatus 5 and outputs a detection result to the centralized control apparatus 5.

Each of the robots 11 and 12 includes a jointed-arm which is operated and controlled by execution of a program by a robot controller 25. The work robot 11 is provided at its arm tip end with a chuck 14 for grasping an outer periphery of the gas generator X. An arm 13 of the irradiation robot 12 is provided at its tip end with an irradiation head 15 for irradiating with ignition energy light R, and an image processing camera 16 for shooting and detecting the gas generator X. The arm of the work robot 11 is operated and controlled between an interior of the processing chamber 10 and the transfer conveyor 2, and grasps the gas generator X using the chuck 14. The arm of the work robot 11 transfers the gas generator X grasped by the chuck 14, and fixes and positions the igniter P such that the igniter P is opposed to the tip end of the arm 13 of the irradiation robot 12. The arm 13 of the irradiation robot 12 is operated and controlled such that the irradiation head 15 mounted to the tip end of the arm 13 is opposed to the igniter P of the gas generator X.

As the irradiation head 15 of the irradiation robot 12, an irradiation head comprising a YAG (yttrium aluminum garnet) laser oscillator 17 and a condensing lens can be employed for example. This irradiation head 15 emits YAG laser light R (ignition energy light) from the laser oscillator 17 and gathers the emitted laser light R using the condensing lens, thereby irradiating the igniter P of the unused gas generator X with the light. As the ignition energy light R emitted from the irradiation head 5, general light such as plasma, electron light, arc discharge can be used in addition to the laser light including the YAG laser light. The image processing camera 16 of the irradiation robot 12 outputs image date of the unused gas generator X to the centralized control apparatus 5.

The gas processing apparatus 4 comprises a suction pump 21 for sucking gas from the processing chamber 10, and a separator 22 for processing gas sucked by the suction pump 21. Gas is introduced into the separator 22 by the suction pump 21, and a filter for collecting fine slugs included in the discharged gas is mounted in the separator 22. The separator 22 is connected to a reservoir 23. The reservoir 23 uses wafer circulated by a circulation pump 24 for cooling the discharged gas. The gas processing apparatus 4 is operated by a command from the centralized control apparatus 5. The gas processing apparatus 4 allows the discharged gas sucked from the processing chamber 10 to pass into the separator 22, thereby collecting the slugs and cooling the gas, and the gas processing apparatus 4 discharged clean gas from the suction pump 21 into the atmosphere. The slugs collected by the separator 22 are deposited and retrieved in the reservoir 23 together with water circulating in the reservoir 23. When wafer in the reservoir 23 is replaced, the used water is neutralized and then discharged, the deposited slugs are removed and after that, new water (clean water) is reserved. A silencer 26 is provided between the processing chamber 10 and the separator 22.

The centralized control apparatus 5 stars operations of the transfer conveyor 2 and the gas processing apparatus 4 by operation by an operator to start processing. The centralized control apparatus 5 also starts operations of the robots 11 and 12 by the robot controller 25. This centralized control apparatus 5 inputs an output from the image processing camera 16 of the irradiation robot 12, and based on this image data, the centralized control apparatus 5 calculates a correction value (deviation) between the igniter P of the gas generator X and the irradiation head 15. Then, the centralized control apparatus 5 outputs the correction value to the robot controller 25. The robot controller 25 controls the operation of the arm 13 to allow the irradiation head 15 to be opposed to the igniter P of the gas generator X. Further, the centralized control apparatus 5 also controls actuation and stop of the transfer conveyor 2 and the work robot 11 by detection values from the operation detection sensor 27.

Next, the gas generator disposal method will be explained.

Unused gas generators including those detached from automobiles are screened.

This screening is carried out if necessary in view of processing ability of the disposal system. That is, there are various unused gas generators having different shapes of the housing 31 and different positions of the igniter P, and only when there exist gas generators which can not by processed by the disposal system are mixed, the screening is carried out. Therefore, even if gas generators having different shapes of the housing 31 and different positions of the igniter 7 are mixed, if they can be processed by the disposal system, the screening is unnecessary.

The same types of screened gas generators X are dropped from the work hopper 6A into the work supply container 6. The centralized control apparatus 5 starts operations of the transfer conveyor 2, the robots 11, 12 and the gas processing apparatus 4.

The unused gas generators X dropped into the work supply container 6 are arranged at the predetermined distances from one another, and sequentially supplied onto the transfer conveyor 2. The unused gas generators X are transferred to the work processing apparatus 3 by the transfer conveyor 2. If the unused gas generators X were transferred to the work processing apparatus 3, the transfer conveyor 2 is once stopped. In this state, the work controller 25 actuates the work robot 11 so that the chuck 14 grasps the outer periphery of the housing 31 of the unused gas generator X. Then, the work robot 11 moves the igniter P of the gas generator X so that the igniter P is opposed to the tip end of the arm 13 of the irradiation robot 12 in the processing chamber 10.

In this state, the irradiation robot 12 shoots and detects the gas generator X using the image processing camera 16, and outputs the image data to the centralized control apparatus 5. The centralized control apparatus 5 received the image data calculates the correction value (deviation) between the irradiation head 15 and the igniter P of the gas generator X, and outputs the result to the robot controller 25. With this, the robot controller 25 controls the operation of the arm of the irradiation robot 12, thereby allowing the irradiation head 15 to be opposed to the igniter P of the gas generator X.

Then, the centralized control apparatus 5 outputs a command to the YAG laser oscillator 17 to allow the YAG laser oscillator 17 to emit the YAG laser light R. This YAG laser light R is gathered by the condensing lens, and the light is emitted from the irradiation head 15 to the igniter P of the gas generator X collectively. With this operation, the igniter P of the gas generator X is ignited by the energy of the YAG laser light R. The gas generator X is operated by ignition of the igniter P to discharge the air bag deploying gas into the processing chamber 10 from gas discharging holes 31a of the housing 31. The gas from the gas generator X is discharged downward of the processing chamber 10. The gas discharged into the processing chamber 10 is introduced into the separator 22 of the gas processing apparatus 4, the fine slugs and the like are collected and cooled here, and are discharged into the atmosphere. When the gas is discharged from the gas generator X, the operation detection sensor 27 detects explosion and ignition which might be caused by the discharged gas, and outputs the detection signal to the centralized control apparatus 5. If the detection result is input from the operation detection sensor 27, the centralized control apparatus 5 allows the robot controller 25 to start the operation of the work robot 11. With this, the work robot 11 transfers the processed gas generator X to the transfer conveyor 2. At the same time, the centralized control apparatus 5 stops the irradiation of the YAG laser light R from the irradiation head 15. In some gas generators X, the discharging amount of gas can be controlled by igniting two igniters P. In the case of such a gas generator X, after one of the igniters P was irradiated with the YAG laser light R, the arms of the robots 11 and 12 are operated and controlled, and the other igniter P is irradiated with the YAG laser light R.

Then, the centralized control apparatus 5 again allows the transfer conveyor 2 to operate, the unused gas generators X is transferred to the work processing apparatus 3, and the processed gas generator X is transferred toward the work accommodating container 7. In this manner, large quantities of unused gas generators X are continuously processed automatically by controlling the operations of the transfer conveyor 2 and the robots 11 and 12.

The igniter P of the gas generator X is formed with a hole by the emitted ignition energy light, and ignition flame and the air bag deploying gas (high-temperature high-pressure gas or high-pressure gas) of the igniter P is emitted from this hole. If the ignition flame or gas from the gas generator X reach the condensing lens of the irradiation head 15, there is an adverse possibility that the condensing lens of the irradiation head 15 is damaged. Therefore, as shown in FIG. 2, it is preferable to protect the irradiation head 15 against the ignition flame and gas by means of an air protector 60 and a gas shield 61.

Figure 2:
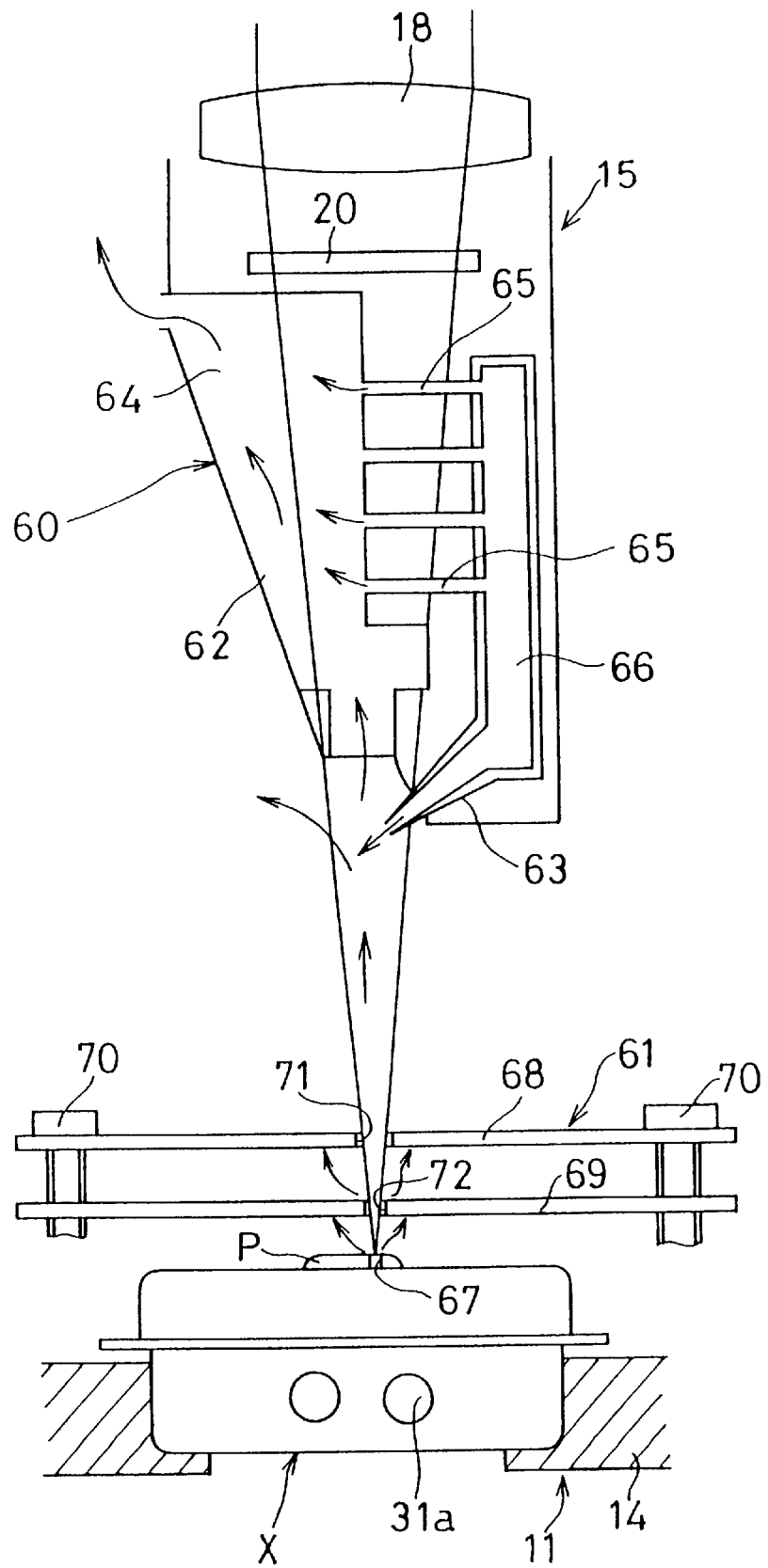
FIG. 2 is an enlarged view of an irradiation head used for the disposal system shown in FIG. 1.

In FIG. 2, the air protector 60 is provided in the irradiation head 15. The air protector 60 includes a clean air emitting mechanism 62 and a clean air nozzle 63. The clean air emitting mechanism 62 forms a discharge passage 64 in the irradiation head 15. The discharge passage 64 introduces gas entering the irradiation head 15 toward outside from the vicinity of a protection glass 20 located below a condensing lens 18. A plurality of air passages 65 are connected into the discharge passage 64. The air passages 65 instantaneously spray high-pressure clean air into the discharge passage 64 continuously. With this operation, the gas discharged from the gas generator X and entering the irradiation head 15 is blown outside from the discharge passage 64 by the high-pressure gas instantaneously sprayed continuously into the discharge passage 64 from each air passages 65. The clean air nozzle 63 extends downward of the irradiation head 15. This clean air nozzle 61 changes a flow of the discharged gas into a direction apart away from the irradiation head 15 by spraying high-pressure air instantaneously. The air passages 65 and the clean air nozzle 63 are connected to a gas supply chamber 66. This gas supply chamber 66 is connected to a high-pressure gas supply source (not shown) for supplying high-pressure clean air.

With this structure, the air protector 60 blows away the gas (high-temperature high-pressure gas or high-pressure gas) emitted from the holes 67 of the igniter P of the gas generator X by the clean air emitting mechanism 62 and the clean air nozzle 63. With this, the air protector 60 blows away the emitted gas by the high-pressure clean gas before the emitted gas reaches the condensing lens 18, thereby protecting the condensing lens 18 of the irradiation head 15.

The gas shield 61 includes a plurality of (two, in the illustrated example) gas shielding plates 68 and 69. The gas shielding plates 68 and 69 are provided such as to cover an upper portion of the gas generator X which was fixed and positioned by the work robot 11. The gas shielding plates 68 and 69 are disposed such as to be superposed on each other in two stages between the irradiation head 15 and the gas generator X. The gas shielding plates 68 and 69 are connected at a predetermined distance from each other by means of a plurality of bolts 70. The gas shielding plates 68 and 69 are respectively formed irradiation holes 71 and 72 each having enough size for allowing the ignition energy light emitted from the irradiation head 15 to pass therethrough.

With this structure, the gas shield 61 shields the ignition flame and gas (high-temperature high-pressure gas or high-pressure gas) emitted from the holes 67 of the igniter P of the gas generator X by means of the gas shielding plates 68 and 69. With this feature, the gas shield 61 reduces especially the amount of flow of the emitted gas reaching the irradiation head 15.

That is, the disposal system 1 and the disposal method of the present invention employs two protecting modes for completely shielding and blocking the ignition flame and gas emitted from the holes 67 of the gas generator X by the gas shield 61 and the air protector 60. The gas shield 61 shields the ignition flame and gas emitted from the holes 67 of the gas generator X, thereby reducing the amount of flow flowing toward the irradiation head 15 from the irradiation holes 71 and 72. The air protector 60 completely shields gas reaching the condensing lens 18 of the irradiation head 15. In the disposal system and the disposal method, if gas emitted from the gas generator X can be eliminated sufficiently by any of the air protector 60 and the gas shield 61, the two protecting modes need not be employed.

As described above, as the gas generator X to be disposed of, there exists a pyro-type gas generator which emits gas by burning the gas generating agent and a hybrid-type gas generator which emits gas by opening the high-pressure gas cylinder.

Figure 3:
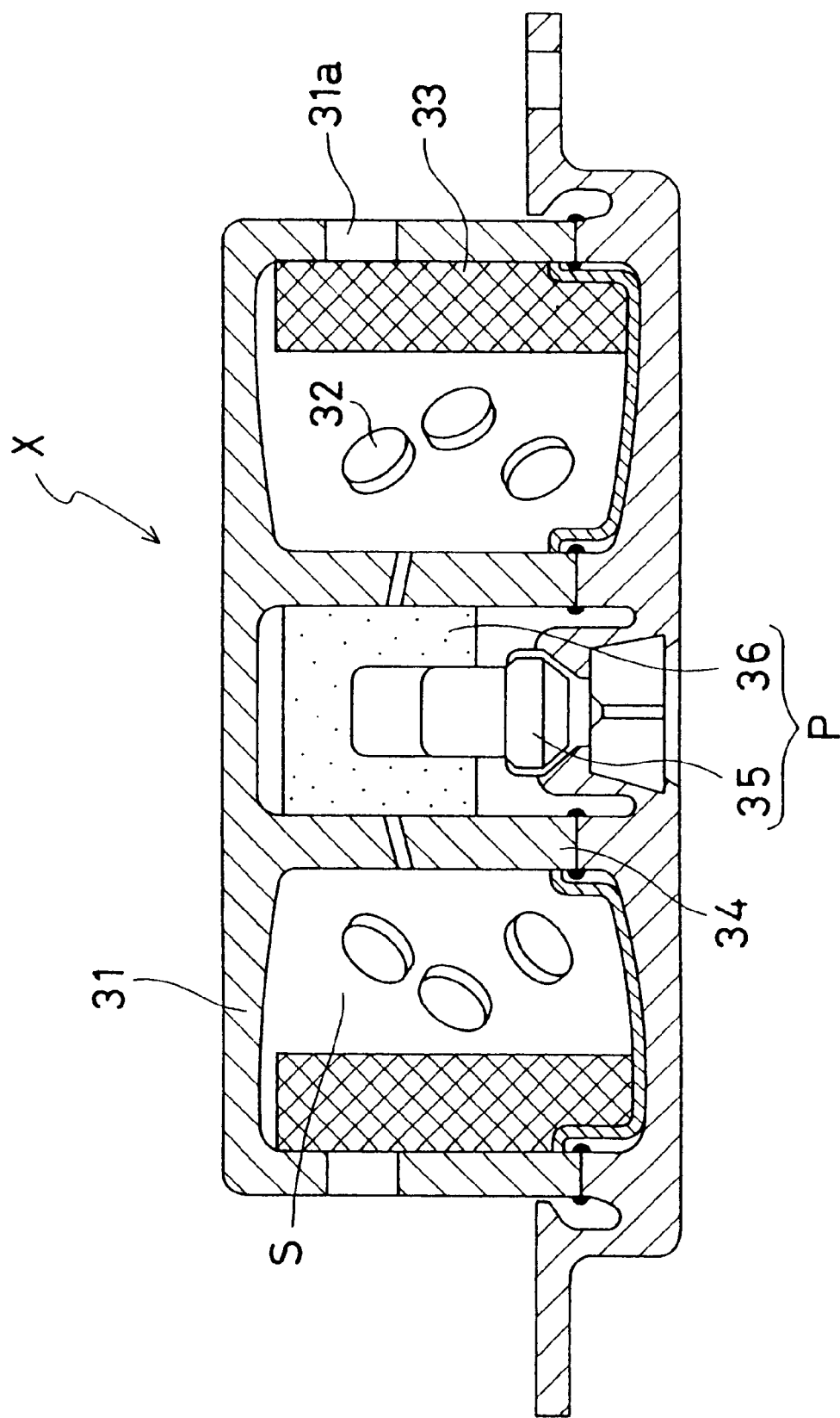
FIG. 3 is a sectional view showing a pyro-type gas generator.

One example of the pyro-type gas generator X is for deploying a driver's seat air bag as shown in FIG. 3.

This gas generator X comprises a double short cylindrical housing 31, a gas generating agent 32 accommodated in an annular space S of the housing 31, and the igniter P disposed in an inner cylinder 34 of the housing 31. The igniter P comprises an ignition tool 35 and an inflammation agent 36, and the gas generating agent 32 is burned by ignition of the ignition tool 35.

To dispose of this gas generator X, as explained using FIG. 1, after the outer periphery of the housing 31 is grasped, fixed and positioned, at least one of the ignition tool 35 and the inflammation agent 36 of the igniter P is irradiated with the ignition energy light to burn. With this, the gas generator X burns the gas generating agent 32 by the ignition of the igniter P. Gas generated by the combustion of the gas generating agent 32 is discharged out from the gas discharging holes 31a of the housing 31 through slug collecting and cooling process by the filter 33.

In this manner, in the pyro-type gas generator X, since it is possible to burn all of flammable gunpowder by irradiating the igniter P with the ignition energy light, danger such as explosion in the subsequent step can be eliminated, and chemical (sodium azide and the like) included in the gas generating agent 36 can be prevented from flowing out. The irradiation of the ignition energy light is not limited to the ignition tool 35 and the inflammation agent 36, and gas may be discharged by irradiating the gas generating agent 32.

As the pyro-type gas generator, there is one for deploying a passenger's air bag or a side collision air bag. This gas generator comprises a long cylindrical housing, a gas generating agent accommodated in the housing, and an igniter disposed at a shaft end of the housing, and the gas generating agent is burned by ignition of the igniter. Some pyro-type gas generators, in order to make it possible to control the deploying mode of the air bag, two ignitions are provided on opposite ends of the long inner cylindrical housing, and the combustion of the gas generating agent is controlled using these ignitions. The igniter of each of the gas generators comprises an ignition tool and an igniter, and the gas is discharged by irradiating any one of them with the ignition energy light.

In some pyro-type gas generator, the igniter comprises only the ignition tool, and the gas generating agent is burned by the ignition of the ignition tool. In this gas generator, any one of the ignition tool and the gas generating agent is irradiated with the ignition energy light to discharge gas.

Figure 4:
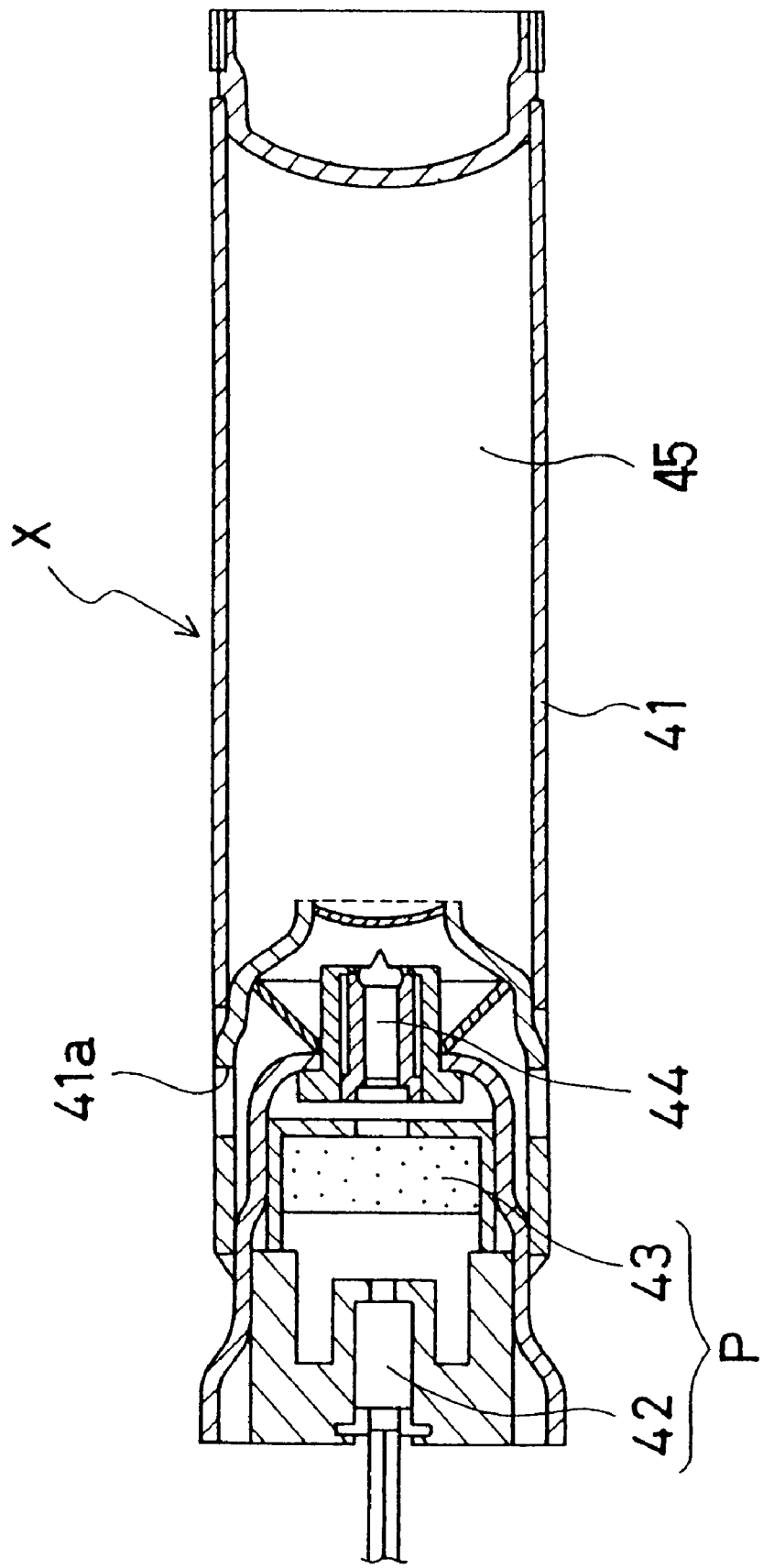
FIG. 4 is a sectional view showing a hybrid-type gas generator.

One example of the hybrid-gas generator X comprises a high-pressure gas cylinder 41 in which high-pressure gas 45 is charged, and an igniter P as shown in FIG. 4. The igniter P comprises an ignition tool 42 and an inflammation agent 43. An operation pin 44 is blown out by ignition (hot air) of the ignition tool 42 to open the high-pressure gas cylinder 41.

When this gas generator X is disposed of, as explained using FIG. 1, after the outer periphery of the high-pressure gas cylinder 41 is grasped, fixed and positioned, at least one of the ignition tool 42 and the inflammation agent 43 of the igniter P is irradiated with the ignition energy light to burn. With this, the gas generator X discharge the high-pressure gas 45 in the high-pressure gas cylinder 41 from gas discharge holes 41a. In this manner, according to the hybrid-type gas generator X, it is possible to burn all of flammable gunpowder by irradiating the igniter P with the ignition energy light, and the high-pressure gas cylinder 41 can be opened and thus, danger such as explosion in the subsequent step can be eliminated.

Figure 5:
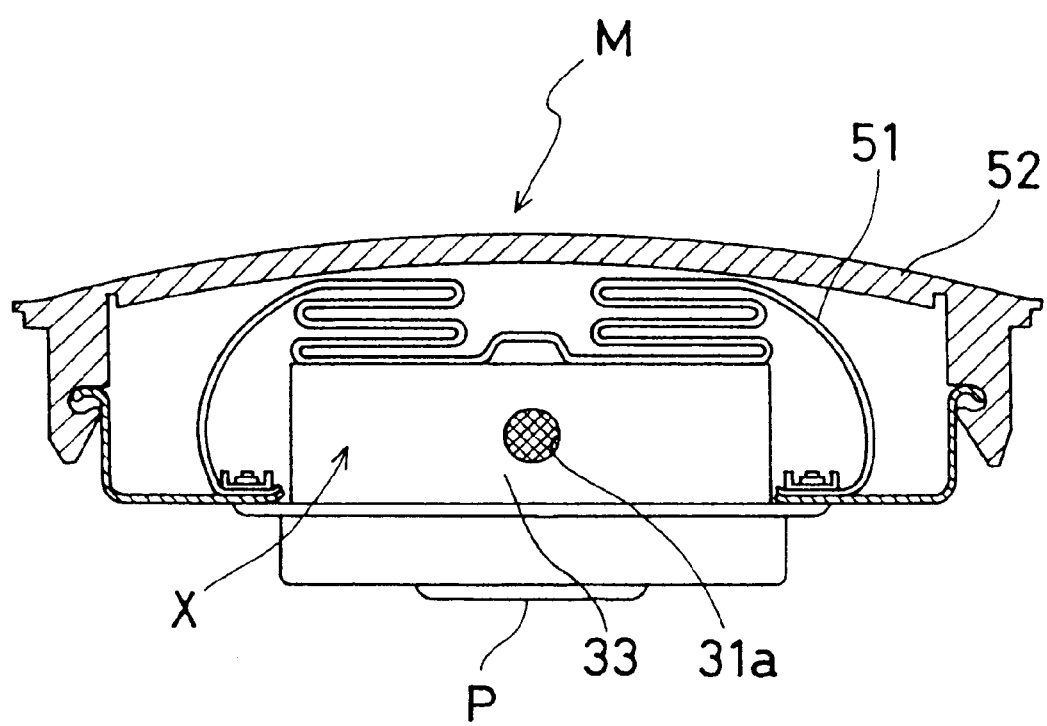
FIG. 5 is a sectional view showing an air bag module.

FIG. 5 shows the gas generator X incorporated in an air bag module M. In a state in which the gas generator X is incorporated in the air bag module M, the igniter P of the gas generator X is irradiated with the ignition energy light to discharge the gas, thereby disposing of the gas generator X. The air bag module M comprises an air bag 51 and the gas generator X both assembled in a bag cover 52, and mounted to a steering wheel of an automobile.

FIELD OF INDUSTRIAL APPLICATION

As described above, this invention is suitable for disposing of an unused gas generator.

What is claimed is:

1. A gas generator disposal method of an unused gas generator (X) for discharging air bag deploying gas by ignition of an igniter (P), comprising a processing step for irradiating said igniter (P) with ignition energy light (R) to ignite said igniter (P), thereby discharging gas from said gas generator (X).

2. The gas generator disposal method according to claim 1, wherein said igniter (P) comprises an ignition tool (35, 42) only, or an ignition tool (35, 42) and an inflammation agent (36, 43) which is ignited by ignition of said ignition tool (35, 42), and only said ignition tool (35, 42) or at least one of said ignition tool (35, 42) and said inflammation agent (36, 43) is irradiated with the ignition energy light (R) to ignite the same.

3. The gas generator disposal method according to claim 1 or 2, wherein said ignition energy light (R) for irradiating said igniter (P) is any one of laser, plasma, electron beam and arc discharge.

4. A gas generator disposal method of an unused gas generator (X) assembled into an air bag module (M) for discharging air bag deploying gas by ignition of an igniter (P), comprising a processing step for irradiating said igniter (P) with ignition energy light (R) to ignite said igniter (P) in a state in which said gas generator (X) is assembled into said air bag module (M), thereby discharging gas from said gas generator (X).

5. The gas generator disposal method according to claim 4, wherein said igniter (P) comprises an ignition tool (35, 42) only, or an ignition tool (35, 42) and an inflammation agent (36, 43) which is ignited by ignition of said ignition tool (35, 42), and only said ignition tool (35, 42) or at least one of said ignition tool (35, 42) and said inflammation agent (36, 43) is irradiated with the ignition energy light (R) to ignite the same.

6. The gas generator disposal method according to claim 4 or 5, wherein said ignition energy light (R) for irradiating said igniter (P) is any one of laser, plasma, electron beam and arc discharge.

7. A gas generator disposal method of an unused gas generator (X) for discharging air bag deploying gas by burning gas generating agent (32) by an igniter (P), comprising a processing step for irradiating said igniter (P) with ignition energy light (R) to ignite said igniter (P), thereby burning said gas generating agent (32) to discharge out the gas, or a processing step for irradiating said gas generating agent (32) with ignition energy light (R) to burn said gas generating agent (32), thereby discharging out the gas.

8. A gas generator disposal system of an unused gas generator (X) for discharging air bag deploying gas by ignition of an igniter (P), comprising energy irradiating means (12) for irradiating said igniter (P) with ignition energy light (R) to ignite said igniter (P).

9. The gas generator disposal system according to claim 8, comprising transfer means (2) for sequentially transferring large quantities of unused gas generators (X), and positioning means (11) for fixing and positioning said unused gas generators (X) transferred by said transfer means (2) such that said igniter (P) is opposed to said energy irradiating means (12).

10. The gas generator disposal system according to claim 8 or 9, wherein said energy irradiating means (12) is protected by a gas shield (61) which shields gas emitted from said gas generator (X).

11. The gas generator disposal system according to claim 8 or 9, wherein said energy irradiating means (12) includes an air protector (61) for blowing out the gas emitted from said gas generator (X) by air spray.

12. A gas generator disposal system of an unused gas generator (X) for discharging air bag deploying gas by ignition of an igniter (P), comprising energy irradiating means (12) for irradiating said igniter (P) with ignition energy light (R) to ignite said igniter (P), gas shielding means (61) for shielding gas emitted from said gas generator (X) to said energy irradiating means (12), and an air protector (60) for blowing out the gas emitted from said gas generator (X) to said energy irradiating means (12) by air spray.

13. A gas generator disposal system of an unused gas generator (X) for discharging air bag deploying gas by ignition of an igniter (P), comprising energy irradiating means (12) for irradiating said igniter (P) with ignition energy light (R) to ignite said igniter (P), transfer means (2) for sequentially transferring large quantities of unused gas generators (X), and positioning means (11) for fixing and positioning said unused gas generators (X) transferred by said transfer means (2) such that said igniter (P) is opposed to said energy irradiating means (12), gas shielding body (61) for shielding gas emitted from said gas generator (X) to said energy irradiating means (12), and an air protector (60) for blowing out the gas emitted from said gas generator (X) to said energy irradiating means (12) by air spray.

* * * * *